United States Patent Office 3,438,473
Patented Apr. 15, 1969

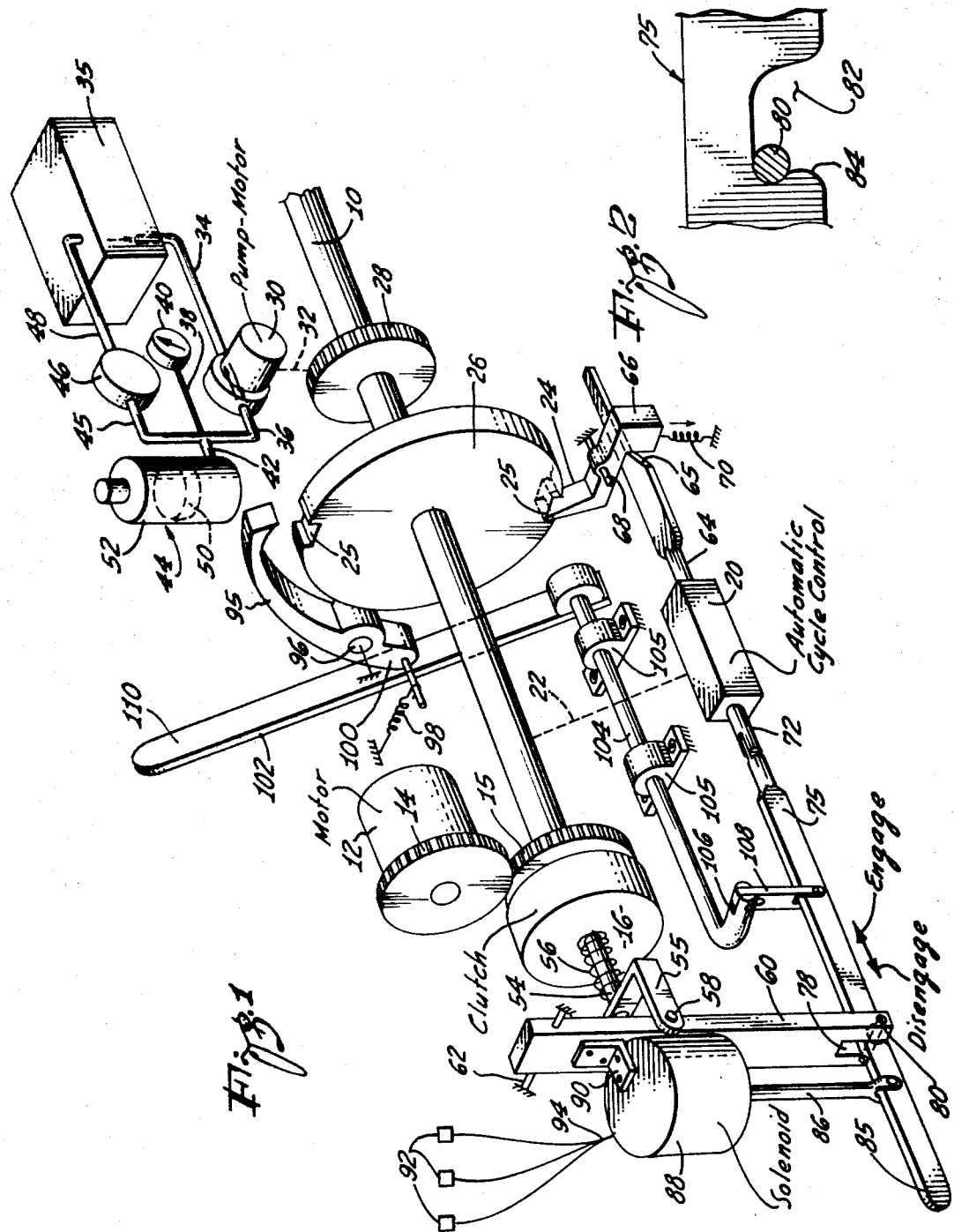

3,438,473
DRIVE SHAFT CONTROL
Herbert E. Rohrbacher, Whittier, Calif., assignor to Bergandi Manufacturing Company, Inc., El Monte, Calif., a corporation of California
Filed Aug. 10, 1966, Ser. No. 571,600
Int. Cl. F16p *3/00*
U.S. Cl. 192—148                    12 Claims

ABSTRACT OF THE DISCLOSURE

In a control system for a cyclically operating mechanism, an operating means is movable from a normal first position to a second position to engage a clutch for operating the mechanism and is retractable to its first position to stop the mechanism, the operating means being biased to its first position. An automatic cycle control advances from a retracted ineffective position to an advanced position for carrying out a predetermined operating cycle and is normally connected to the operating means to move the operating means to its second position for engaging the clutch when the automatic cycle control is advanced. In an emergency, the operating means is disconnected from the advanced automatic cycle control to return to its first position to stop the mechanism without disturbing the advanced position of the automatic cycle control. When the emergency ceases, the operating means is manually returned to its second position and is connected to the advanced automatic cycle control for completion of the interrupted cycle of operation.

---

This invention relates to means to control a drive mechanism and, more particularly, relates to a control system for carrying out a predetermined cycle of operation of the mechanism. The control system operates means such as a switch or a clutch to initiate and terminate a cycle of operation and at the end of a cycle stored energy is released to decelerate the mechanism to the extent of actually starting reverse operation of the mechanism. As soon as the reverse operation starts, a pawl or dog engages a stop shoulder of a rotary indexing means to stop the mechanism at a predetermined point.

A control system of this general character is disclosed in the Bergandi et al. Patent 3,144,887, entitled, "Shaft Positioning Device," which control system, by way of example, is described as applied to a wire netting machine of the character disclosed in the Bergandi Patent 2,625,-961. Both of these prior disclosures are incorporated into the present disclosure by reference.

The problem to which the present invention is directed is to incorporate into such a control system additional means to stop the mechanism in the event that an emergency occurs at some point within the operating cycle. More particularly, the problem is to provide an emergency stop that will not disrupt the instant adjustment of the automatic cycle control and therefore will permit the automtic cycle conrol to complete the interrupted operating cycle after the emergency is met.

This problem is solved in part by employing an operating means that is movable in one direction from a first position to a second position to apply power to the mechanism and is movable in the opposite direction back to the first position to terminate the application of power, the operating means being biased in said opposite direction. The problem is further solved by associating an automatic cycle control with the operating means.

To begin a cycle of operation, the automatic cycle control advances to move the operating means from its first position to its second position to cause the clutch to engage. At the end of the operating cycle the automatic cycle control retracts to return the operating means to its first position to disengage the clutch and at the same time applies pawl means to a rotary indexing means to stop the mechanism. In the event an emergency occurs during an operating cycle, the operating means is released from the automatic cycle control to permit the operating means to return to its first position to disengage the clutch without disturbing the advanced position of the automatic cycle control. At the same time pawl means is applied to the indexing means to stop the mechanism. When the emergency is ended, the operating means is again returned to its second position and connected to the advanced automatic cycle control to cause the clutch to be engaged for completion of the operating cycle.

In the preferred practice of the invention, the automatic cycle control is provided with a shoulder to releasably engage the operating means. The emergency means simply disengages the shoulder from the operating means to permit the operating means to return to its first position without disturbing the advanced position of the automatic cycle control.

The various features and advantages of the invention may be understood by reference to the following detailed description and the accompanying drawing.

In the drawing, which is to be regarded as merely illustrative:

FIG. 1 is a diagrammatic perspective representation of the control system; and

FIG. 2 is a fragmentary view showing how a shoulder of the clutch operating member is releasably connected to the clutch.

Referring to FIG. 1, it is contemplated that a mechanism represented by a drive shaft 10 will be rotated clockwise through a given number of revolutions to carry out an operating cycle. In a wire netting machine of the general character disclosed in the previously mentioned Patent 2,625,961, a mandrel (not shown) in the form of a blade is mounted as an axial extension of the drive shaft 10 and two wires from two reels, respectively, are wound onto the rotating mandrel to form simultaneously two wire coils having the given number of turns. In the course of the operating cycle, the newly formed coils are threaded into the previously formed wire fabric. The formed coils are then severed and the coil forming cycle is repeated.

The drive shaft 10 is actuated by a motor 12 by means of a pair of gears 14 and 15 and a clutch 16. What may be termed an automatic cycle control shown diagrammatically as a box 20 is responsive to rotation of the drive shaft 10 as indicated by the dotted line 22 and counts the revolutions of the shaft that are necessary to carry out an operating cycle, the automatic cycle control engaging the clutch to initiate an operating cycle and releasing the clutch to terminate the operating cycle. The construction and operation of such an automatic control is well known in the art.

When the automatic cycle control 20 causes the clutch to engage, it withdraws a first stop dog or pawl 24 from one of the notches 25 of an indexing disk 26 that is carried by the drive shaft 10 and when the automatic cycle control releases the clutch 16 to terminate an operating cycle, the automatic clutch control simultaneously applies the dog 24 to the indexing disk.

In accord with the teachings of the previously mentioned patent 3,144,887, energy is stored to decelerate the drive shaft 10 at the end of an operating cycle, the deceleration being carried to the extent of actually initiating reverse rotation of the drive shaft. For this purpose a gear 28 on the drive shaft 10 is operatively connected to a pump-motor 30 as indicated by the dotted line 32. The pump-motor 30 is a gear pump that may be power actuated to serve as a pump or alternately may be operated as a hydraulic motor.

The intake side of the pump-motor 30 is connected by pipe 34 to a hydraulic fluid reservoir 35 and the output side of the pump-motor is connected to a pipe 36. The output pipe 36 has three branches, one branch 38 being connected to a pressure gage 40, a second branch 42 being connected to a conventional hydraulic accumulator 44, and a third branch 45 being connected to a relief valve 46 which in turn is connected to a return pipe 48 back to the reservoir 35. Preferably the accumulator 44 is of a conventional cylinder type having an internal piston 50 which operates against an air pocket 52.

When the drive shaft 10 is rotated in its normal working direction, a portion of the power applied to the shaft is diverted to the pump-motor 30 to cause the pump motor to pump hydraulic fluid through the relief valve 46 back to the reservoir 35. The relief valve 46 is adjustable and is adjusted at a suitable pressure, which pressure is maintained in the air pocket 52 during an operating cycle.

It is apparent that when an operating cycle is initiated by engagement of the clutch 16, the pressure in the accumulator 45 will build up to the value for which the relief valve 46 is adjusted. When the operating cycle is terminated by disengagement of the clutch 16, the drive shaft 10 is quickly decelerated because of the power consumed by the pump-motor 30. The resistance to operation of the pump-motor brings the drive shaft 10 to a standstill and then the pressure in the air pocket 52 causes reverse blow of the hydraulic fluid from the accumulator to the pump motor 32 to cause the pump motor to function as a motor and to reverse its direction of operation. The reversal of the operation of the pump-motor 30 causes corresponding reverse rotation of the drive shaft 10 and with the pawl 24 effective at this time, the pawl quickly engages a notch 25 of the indexing disk 26 to bring the drive shaft 10 to a stop at a predetermined rotary position of the drive shaft.

All of the structure broadly described up to this point is old in the art. The improvement taught by the invention will now be described.

The clutch 16 is of a well known type which has an axial member 54 formed with a clevis 55, the axial member controlling operation of the clutch and being biased by a spring 56 leftward as viewed in FIG. 1 for disengagement of the clutch. The clevis 55 is connected by a pivot pin 58 to an intermediate point of an operating means in the form of a pendant lever 60 that swings about an upper pivot 62. It is apparent that the lower end of the operating means 60 may be swung to the right as viewed in FIG. 1 from a normal first position to a second position to cause the clutch to engage and it is further apparent that if the operating means is unrestrained, the spring 56 will cause it to seek its leftward first position at which the clutch is disengaged.

The automatic cycle control 20 includes a control rod 64 that is advanced longitudinally to the right as viewed in FIG. 1 to initiate an operating cycle and is subsequently retracted to the left to terminate the operating cycle. One end of the control rod 64 is formed with a cam shoulder 65 to cooperate with one arm 66 of a bellcrank that is mounted on a pivot 68, the second arm of the bellcrank being the previously mentioned first pawl 24 for cooperating with the indexing disk 26 to stop reverse rotation of the drive shaft 10. A suitable spring 70 biases the bellcrank in the direction to urge the pawl 25 into engagement with the indexing disk 26. When the control rod 64 is advanced to the right as shown in FIG. 1 to start an operating cycle, the cam shoulder 65 acting on the arm 66 of the bellcrank retracts the pawl 24 in opposition to the force exerted by the biasing spring 70. When the control rod 64 is returned to its starting position to terminate an operating cycle the cam shoulder 65 releases the bellcrank to permit the biasing spring 70 to swing the pawl 24 against the indexing disk 26.

A pivot pin 72 pivotally connects an extension 75 to the second end of the control rod 64. To releasably connect the automatic cycle control to the operating means, the operating means is formed with a notch 78 to straddle the pivoted extension 75 and is further provided with a pin 80 extending across the notch. As best shown in FIG. 2, the lower longitudinal edge of the pivoted extension 75 is provided with a recess 82 to receive the pin 80, the recess forming a shoulder 84. Normally the pivoted extension 75 rests gravitationally on the cross pin 80 in the manner shown in FIG. 2 with the cross pin above the shoulder 84.

When the extension 75 of the control rod 64 holds the control means 60 at its rightward position as viewed in FIG. 1 for the purpose of carrying out an operating cycle, the operating cycle may be interrupted by merely swinging the pivoted extension 75 upward out of engagement with the cross pin 80 to permit the biased operating means to disengage the clutch. Therefore to carry out the purpose of the present invention, emergency means is provided to swing the pivoted extension 75 of the control rod 64 upward out of engagement with the cross pin 60 and additionally to apply a stop pawl to the indexing disk 26. After the emergency is taken care of, the operating cycle may be resumed by merely swinging the lower end of the operating means 60 to the right to cause the cross pin 80 to engage the recess 82 of the pivoted extension 75. Thus the emergency stop means does not interfere with the position to which the control rod 64 is advanced to carry out an operating cycle.

To provide manual means for swinging the pivoted extension 75 upward for an emergency stop, the pivoted extension is formed with a handle 85. To stop the mechanism automatically for an emergency, an upward extending link 86 connects the pivoted extension 75 to a solenoid 88 that is fixedly mounted on the operating means by a suitable bracket 90.

The circuitry for controlling the solenoid 88 may include three sensors 92 connected to the solenoid by wires 94. Each of the three sensors 92 is capable of closing a switch to energize the solenoid. In a mechanism for fabricating wire netting, for example, two of the three sensors 92 may be associated with the two reels respectively that supply the two wires to be formed into coils and the third sensor may be positioned adjacent the previously mentioned blade or mandrel that forms the coils. In the event that the wires become snarled at any one of the three places, the corresponding sensor 92 causes the mechanism to be halted abruptly.

A second pawl 95 is positioned adjacent the indexing disk 26 to stop the mechanism at a predetermined position in the event of an emergency, the second pawl functioning in the same manner as the first pawl 24. The second pawl 95 is mounted on a fixed pivot 96 and is biased by a spring 98 towards engagement with the indexing disk 26, the spring being connected to a control arm 100 of the pawl. Normally the second pawl 95 is held in a retracted position by impingement of an arm 102 against the control arm 100 as shown in FIG. 1.

The arm 102 is mounted on a shaft 104 that is journaled in spaced bearings 105 and is provided with a radial arm 106. The radial arm 106 overhangs the pivoted extension 75 and is operatively connected thereto by a suitable link 108. It is apparent that when the pivoted extension 75 is lifted either by means of the handle 85 or by operation of the solenoid 88, the pivoted extension acting through the link 108 rocks the shaft 104 to swing the arm 102 rearward and thus release the second pawl 95 for engagement with a notch 25 of the indexing disk 26. Preferably the arm 102 has an extension 110 which serves as a handle that may be manipulated to stop the mechanism in an emergency. When an emergency stop is made, the indexing disk 26 is first decelerated and then starts to rotate in the reverse direction as heretofore described.

It is apparent from the foregoing description that in the event of an emergency the mechanism may be readily stopped at an intermediate point in an operating cycle and that after the emergency is met the operating cycle may be completed. An emergency stop may be made by actuation of any one of the sensors 92 or an operator upon observing an emergency may manually operate either the handle 85 or the handle 110 to stop the mechanism without disturbing the automatic cycle control 20.

I claim:

1. A control system for a cyclically operating mechanism, comprising:

operating means movable from a normal first position to a second position to apply actuating power to the mechanism and movable from the second position to the first position to terminate the application of power, said operating means being biased to its first position;

an automatic cycle control to advance from a retracted ineffective position to an advanced position for carrying out a predetermined operating cycle and to return automatically to its retracted position at the end of the operating cycle, said operating means being normally operatively connected to the automatic cycle control for movement thereby to its second position to start an operating cycle when the automatic cycle control is advanced and for return thereby to its first position when the automatic cycle control is retracted;

a rotary indexing means incorporated in the mechanism for actuation thereby simultaneously therewith and having at least one peripheral stop shoulder for engagement by the automatic cycle control to terminate an operating cycle; and emergency means to engage said peripheral stop shoulder and to disengage the operating means from the automatic cycle control at the advanced position thereof to permit the operating means to return to its first position to interrupt an operating cycle while the automatic cycle control is still advanced, whereby after an emergency, the operating means may be returned to its second position and again connected to the automatic cycle control for completion of the interrupted operating cycle.

2. A combination as set forth in claim 1 which includes at least one means to sense an emergency during an operating cycle; and means responsive to said sensing means to disengage said operating means from said automatic cycle control.

3. A combination as set forth in claim 2 in which said automatic cycle control is provided with a shoulder that normally engages said operating means, said shoulder being movable by said responsive means out of engagement with the operating means.

4. A combination as set forth in claim 3 in which said operating means is manually releasable from the automatic cycle control independently of said responsive means.

5. A combination as set forth in claim 1 in which a portion of said automatic cycle control is pivoted for swinging movement in an upright plane;

in which said pivoted portion of the automatic cycle control normally gravitationally rests on the operating means; and in which said portion has a shoulder on its underside in releasable engagement with the operating means whereby when the automatic cycle control is at its advanced position said portion may be swung upward to release the operating means without disturbing the advanced position of the automatic cycle control.

6. A combination as set forth in claim 1 which includes two separate pawls to engage the stop shoulder, one pawl being responsive to advance and retraction of said automatic cycle control, the other pawl being responsive to disengagement of the operating means from the automatic cycle control when the automatic cycle control is at its advanced position.

7. A control system as set forth in claim 1 which includes means to restore the engagement of said automatic cycle control with said operating means in response to movement of the operating means from its first position to its second position while the automatic cycle control is advanced.

8. A control system for a cyclically operating mechanism, comprising:

a clutch engageable to connect the mechanism to a power source, said clutch being biased to disengage;

an automatic cycle control releasably connected to the clutch and movable to an advanced position to engage the clutch to start a predetermined operating cycle and retractable from the advanced position to disengage the clutch to terminate the cycle;

means operated by the mechanism to store energy when the mechanism is running and to release the energy in response to disengagement of the clutch to decelerate the mechanism and then to reverse the operation of the mechanism;

emergency means to disconnect the automatic cycle control from the clutch to permit the clutch to disengage to interrupt a cycle while the automatic cycle control is still advanced whereby the operating cycle may be subsequently continued by again connecting the clutch to the advanced automatic cycle control to complete the interrupted operating cycle; and means to engage said mechanism to limit the reverse operation of the mechanism, said limiting means being responsive to said automatic cycle control to operate when a cycle is terminated and being responsive to said emergency means to interrupt a cycle.

9. A combination as set forth in claim 8 in which said limiting means includes two pawls to engage the mechanism, one of the pawls being responsive to the automatic cycle control, the other pawl being responsive to said emergency means.

10. In a control system having cyclically operating mechanism, the combination of:

a drive shaft;

operating means movable from a first position to a second position to apply power to the drive shaft, said operating means being biased to its first position;

an automatic cycle control including a control rod to advance to carry out an operating cycle and to retract to terminate the operating cycle;

rotary indexing means operating with the drive shaft and having at least one peripheral stop shoulder;

means normally connecting said operating means to said control rod for movement of the operating means from its first position to its second position by advance of the control rod and for movement from its second position to its first position by retraction of the control rod, said connecting means being releasable in an emergency to permit the operating means to return to its first position to interrupt an operating cycle while the control rod is still advanced, whereby after the emergency the operating means may be returned to its second position and again connected to the advanced control rod for completion of the operating cycle;

a first pawl to engage a shoulder of the indexing means in response to advance of the control rod; and a second pawl to engage a shoulder to the indexing means in response to release of said connecting means in an emergency.

11. A combination as set forth in claim 10 in which said control rod has a pivoted portion for pivotal movement to disconnect the control rod from the operating means, said second pawl being operatively connected to said pivoted portion for operation thereby.

12. A combination as set forth in claim 11 which includes means to sense a malfunction of the cyclically operating mechanism and which includes means responsive to said sensing means to actuate said pivoted portion to interrupt an operating cycle.

References Cited

UNITED STATES PATENTS

| | | | |
|---|---|---|---|
| 884,051 | 4/1908 | Taft | 192—139 X |
| 723,593 | 3/1903 | Ensign | 192—33 |
| 1,944,994 | 1/1934 | Nepple | 192—33 |
| 2,306,949 | 12/1942 | Ipsen | 192—129 |
| 2,886,838 | 5/1959 | Eygabroad | 192—127 |
| 3,144,887 | 9/1964 | Bergandi et al. | 60—53 |

CARLTON R. CROYLE, *Primary Examiner.*

ALLAN D. HERRMANN, *Assistant Examiner.*

U.S. Cl. X.R.

192—12, 83, 101, 125